FIELD-EFFECT INTEGRATED CIRCUIT AND METHOD OF FABRICATION

Filed June 24, 1968 2 Sheets-Sheet 1

INVENTOR.
MARK W. LEVI
BY Harry A. Herbert Jr
and
Julian L. Siegel
ATTORNEYS

May 19, 1970 M. W. LEVI 3,513,365

FIELD-EFFECT INTEGRATED CIRCUIT AND METHOD OF FABRICATION

Filed June 24, 1968 2 Sheets-Sheet 2

INVENTOR.
MARK W. LEVI

BY

Julian L. Siegel
ATTORNEYS

United States Patent Office 3,513,365

Patented May 19, 1970

3,513,365

FIELD-EFFECT INTEGRATED CIRCUIT AND METHOD OF FABRICATION

Mark W. Levi, 6 Knollwood Road, New Hartford, N.Y. 13413

Filed June 24, 1968, Ser. No. 739,235
Int. Cl. H01l 19/00
U.S. Cl. 317—235 29 Claims

ABSTRACT OF THE DISCLOSURE

An integrated circuit operating at about 77° Kelvin having first and second field-effect transistors, a digital terminal being connected to the source of each transistor and capacitively coupled to the drain of the first transistor and the gate of the second transistor. A first read terminal is connected to the drain of the second transistor and capacitively coupled to the drain of the first transistor while a second read terminal is capacitively coupled to the drain of the first transistor. The method of fabrication makes use of stray capacitance in the laying of the layers.

BACKGROUND OF THE INVENTION

This invention relates to field-effect trensistors and more particularly to an integrated circuit that can be used either as a crosspoint, as a switch, or as a memory cell.

The present invention solves the problem of making high multiple crosspoint switches, large associative memories, and large cheap memories. The efficient utilization of the stray capacitances within the integrated circuit cell provides simplified operation and minimizes the space occupied by the cell.

The specific design of the cell permits placement within a small space, such as a 10 x 10 micron square. Such cells are adapted for production in the form of arrays.

SUMMARY OF THE INVENTION

The integrated circuit or cell can be used in any or all of four ways: as a crosspoint, as a switch (for multiplexing, for example), as a memory cell, and/or as an associated memory cell.

A method of operation of the above-mentioned cells in large arrays are fully utilized by using the stray capacitance. The use of such cells below 200° Kelvin makes them reliable and practical.

The efficient utilization of the stray capacitance within the cell provides a simplified operation and minimzes the space occupied by the cell. The invention can be used in constructing communications gear of small size and low weight and can provide cheap, fast, random access memories.

It is therefore an object of the invention to provide novel integrated circuits.

It is another object to provide novel field-effect transistor circuits.

It is another object to provide arrays of field-effect transistor circuits usable as crosspoints, switches, and memories.

It is still another object to provide an integrated circuit including field-effect transistors.

It is still another object to provide novel structures for integrated field-effect transistor circuits.

It is still another object to provide unique methods for the operation of field-effect transistor circuits.

These and other advantages, features and objects of the invention will become more apparent from the following description taken in connection with the illustrative embodiments in the accompanying drawings, wherein:

DESCRIPTION OF THE PREFERRED EMBODIMENTS

Figure 1:
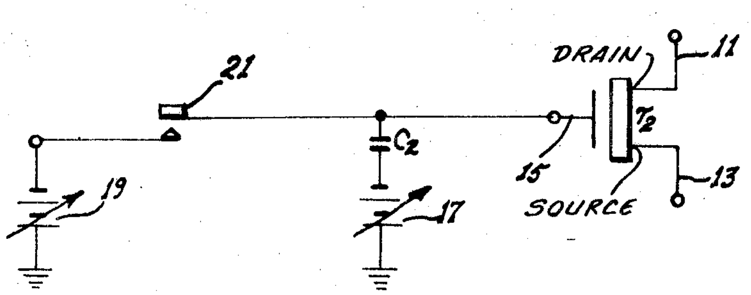
FIG. 1 is a circuit diagram showing a basic concept of the invention.

Referring to FIG. 1, there is shown a circuit diagram of a basic embodiment of the invention. Field-effect transistor $T_2$ has two terminals 11 and 13 in which current can be controlled by application of a voltage or charge to gate control terminal 15. One terminal of capacitor $C_2$ is connected to terminal 15, the other to controlled voltage driving source 17. Capacitor $C_2$ can be charge by controlled voltage driving source 19 through switch 21 which connects the driving source 19 when closed and isolates the charge when open. Terminals 11 and 13 can then be reversibly controlled by capacitive coupling of source 17 to terminal 15 through capacitor $C_2$. The character of the control will be determined by the charge previously deposited, the voltage of source 17, and the gate control voltage which is required to cause $T_2$ to conduct between terminals 11 and 13.

Figure 2:
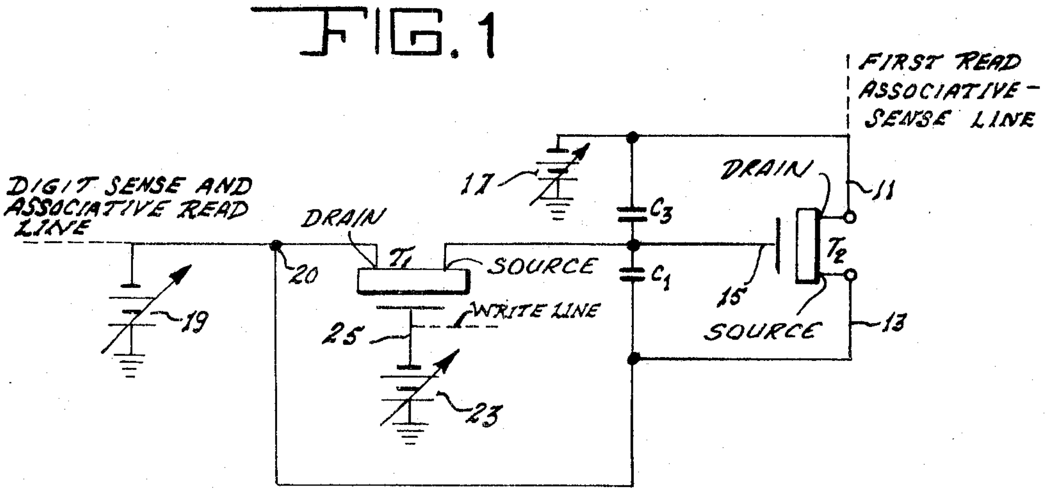
FIG. 2 is a circuit diagram showing a first embodiment of the invention.

Referring to FIG. 2, there is shown an embodiment where switch 21 has been replaced by field effect transistor $T_1$ and controlled voltage driving source 23. The first-read associative-sense line is connected to terminal 11 of transistor $T_2$ and the digit sense associative read line is connected to terminal 20 of transistor $T_2$. The write line is connected to gate control terminal 25 of transistor $T_1$.

Figure 3:
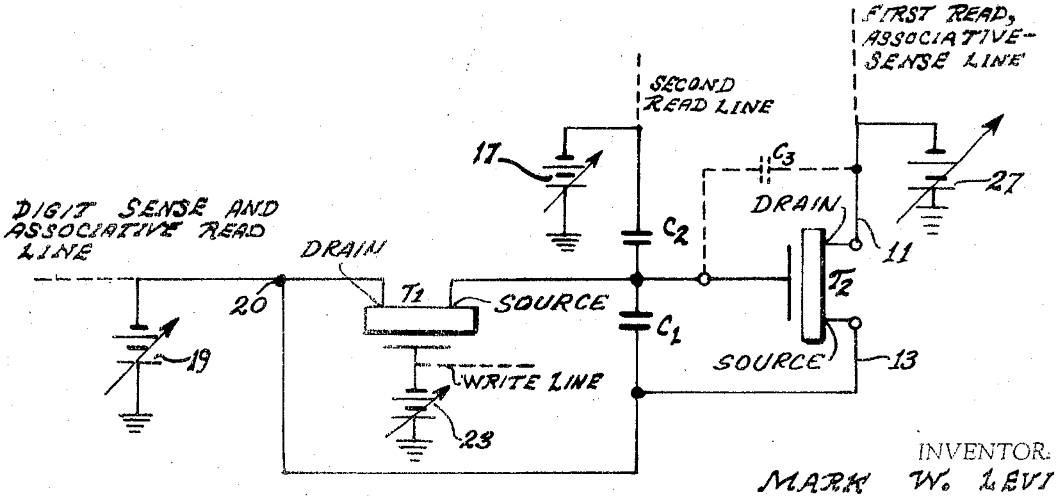
FIG. 3 is a circuit diagram of a second embodiment of the invention having an isolated associative-sense terminal.

In FIG. 3 there is shown a circuit modified to give an isolated associative terminal. Controlled voltage driving source 27 is connected to terminal 11 and a second read line is connected to terminal 19. In FIG. 3, $C_3$ is shown in dotted lines which represents the stray capacitance between the juncture of $C_1$, $C_2$, and the gate of $T_2$ and the drain of $T_2$ or terminal 11, whereas in FIG. 2, $C_3$ is shown in solid lines which represents both the stray capacitance together with the capacitance from read line 2 (FIG. 4).

FIGS. 1 to 3 show circuits for single cells which can belong to a large array of cells. Within such an array, write, first and second reads of a cell would be common connections to a row of cells. The digit terminal would be common to an intersecting column of cells within the same array.

In order that there be a usable fraction of the available time of a large array of such cells, it is necessary that the leakage period exceed one second, and it is preferable to have it much longer. Since $C_1$ plus $C_2$ plus $C_3$ will be at most $10^{14}$ farads (in a cell small enough to put $10^7$ cells on one silicon slice), the required leakage resistance is at least $10^{14}$ ohms, and preferably much larger. The chief source of leakage is the drain to source leakage of transistor $T_1$. The state of the art is such that this resistance will not exceed $10^{12}$ ohms at room temperature, but by operating the cell below 200° Kelvin, a resistance in excess of $10^{15}$ ohms can be obtained, thus making the small cell practically operable.

Figure 4:
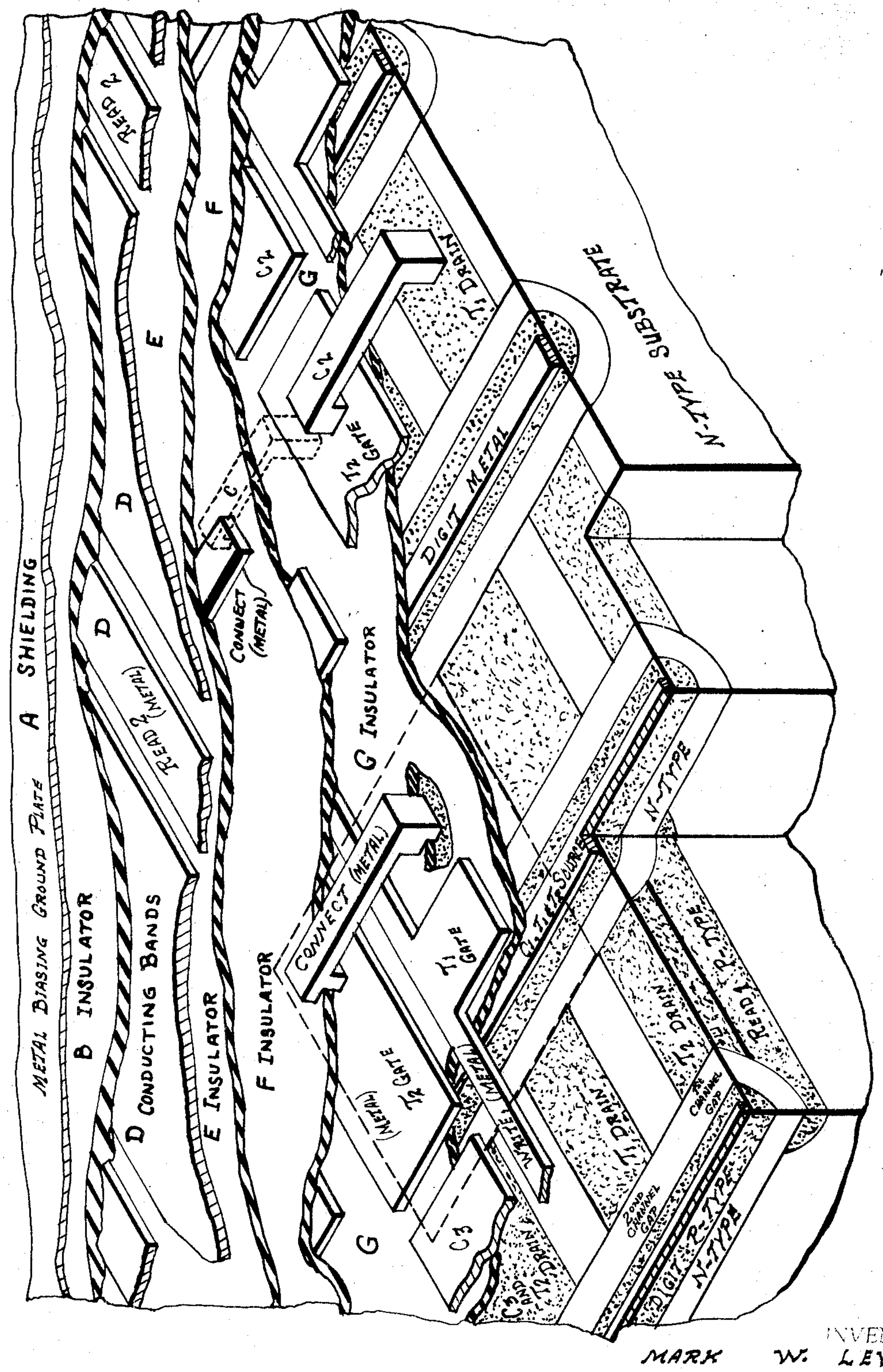
FIG. 4 is an isometric drawing of an array of field-effect transistor circuits.

In FIG. 4 there is shown an array of the cells as shown in FIGS. 2 and 3 for indicating the steps of fabrication. The invention is described using particular polarities of semiconductor materials but it is understood that these polarities can be reversed; that is, P-type semiconductor material could be changed to N-type, and vice versa.

P-type semiconductor material is used for the drain of transistor $T_2$ and the read 1 terminal. A mask is first applied and windows in the mask for these drain areas are opened after an initial diffusion of the read 1 line, and the read 1 line is allowed to diffuse deeper. The mask is then removed and the next mask is prepared. The digit line is prepared by N-type isolation diffusion made to such a depth that transistor $T_1$ drain area is isolated, but the read 1 line area retains a P-type connection beneath the digit isolation diffusion. At this point no mask change is made. A P-type diffusion is made to form the isolated P-type digit line. A metal strip is plated onto the digit line to improve its conductivity. The metal is not as wide as the P-type digit line since diffusion proceeds under the mask whereas the plating does not. The mask is then stripped off and the gate insulator layer G is deposited.

A metal pattern is deposited either additively or subtractively for the gate of transistor $T_1$ and write lines, respectively. The overlap of the gate of transistor $T_1$ provides capacitor $C_1$ and capacitor $C_3$. A hole is then opened in the gate oxide to expose the P-type region which is the drain of transistor $T_1$. A layer of insulator F is then deposited. Two holes are opened in the insulator and connecting metal is deposited either additively or subtractively in order to connect the gate of transistor $T_2$ to the drain of transistor $T_1$. Another layer of insulator E is then deposited. A metal pattern D is then deposited either additively or subtractively. Of this pattern, the read 2 line provides the second plate of a portion of capacitor $C_2$ (the gate of transistor $T_2$ provides the first plate). The remainder of the pattern is a ground plane which is to be biased electrically in such a way as to prevent field-effect transistor action between cells. Another layer of insulator B is deposited and a metal biasing ground plane A electrically connected to the first ground plane.

It is to be understood that it is the structure which is the basis of the invention rather than the particular steps used in the fabrication. The structure can be divided into two portions: (a) the semiconductor structure, and (b) the overlying insulator and conductor structure.

The first semiconductor structure consists of: (a) buried P-type strips which are periodically connected to the surface by P-type plugs. These form what is shown in FIG. 4 as "Read 1 P-type" and "$T_2$ Drain." The plugs are aligned so as to permit: (b) digit P-type strips to be on the surface (in a direction perpendicular to the direction of the buried strips) and isolated from them. These digit strips serve two functions: they form the digit line (or associative read), they are also the sources of both $T_1$ and $T_2$. (c) Isolated plugs in the surface, one paired with each $T_2$ drain. These plugs are the $T_1$ drains. Between the digit P-type strips and the $T_1$ and $T_2$ drains are respectively the first and second channel gaps.

A second semiconductor structure can be obtained by having a buried layer rather than buried strips. The layer contacts only the $T_2$ drain plugs. This semiconductor structure cannot be used in the associative memory mode, but it should provide faster ordinary memory by virtue of the lower resistance of the buried layer as compared to that of a buried strip.

In both semiconductor structures the "digit metal" in FIG. 4 can be included or not. If included the array will be faster due to the lowered digit-line resistance; if not included the construction would be easier.

The overlying conductor (metal) and insulator structures can be varied in several ways. The structure, as shown in FIG. 4, corresponds to any array of circuits as in FIG. 3, although a FIG. 2 circuit could be simulated with an external connection of read 1 to read 2.

A first modification which does not alter the circuit is the substitution of the connecting link C (as shown by the dotted lines in FIG. 4) for the "connect (metal)." This provides a different but equivalent pairing of $T_1$ and $T_2$ transistors. This change has both advantages and disadvantages. An advantage is that crossovers are eliminated between "write (metal)" and "connect (metal)," thus making layer F of insulator unnecessary. The disadvantage is that the "connect (metal)" is no longer shielded from the semiconductor surface, and the G insulator must be thickened to prevent self-induced conduction in $T_1$ (from $T_1$ drain to $T_2$ drain).

A second alteration can be performed on either the original or first altered overlying structures. It consists of removing layers A and B and having layer D continuous. This changes the circuit to that in FIG. 2.

A third alteration can be performed on any of the second altered overlying structures and consists of removing layer D (or layer D and E). This reduces the storage capacitance of each cell and eliminates shielding (disadvantages) but has the advantage of reducing the number of layers of metalization.

Any of the alterations of the overlying structure can be used over the first semiconductor structure, but only the original and first modified overlying structures are suitable for use on the second semiconductor structure. "Removing" in all cases merely means "not putting on in the first place."

With all constructions, cells are of such a form that minimal surface area is required per cell in the sense that the area per cell is not appreciably larger than is required for the access connections alone. With state of the art construction techniques (the ability to make masks with 0.6 micron width holes) such cells can easily be constructed in a 10 x 10 micron size. Maximum utilization is made of the surface area by embodying the capacitors $C_1$, much of $C_2$, and $C_3$ as the stray capacitances between the metal gate of transistor $T_2$ and the digit, read 2, and read 1 lines.

The operation of the invention is explained as follows:

Information is stored in the form of a real charge on the $T_2$ gate capacitance. The charge is introduced by applying a voltage to the digit terminal while simultaneously applying a voltage to the write terminal so as to cause transistor $T_1$ to conduct. Subsequent application to the write terminal of a voltage causes transistor $T_1$ to become nonconductive and traps the charge on capacitors $C_3$, $C_2$, and $C_1$. Subsequent change of the digit voltage to some other value does not change the real charge on the gate, although it does change the gate potential. In other words, the digit voltage has been stored, but may be reversibly added to by capacitive coupling of voltages on any of the lines digit, read 2, or read 1. The various modes of operation of the cell are obtained by appropriately choosing the real charge to be stored and the subsequent applications of voltages to the digit, read 2, and read 1 lines. Sensing circuits must also be present on these same lines, and the impedance to ground of some lines must be controlled. It is assumed that the resting potential of the digit lines is zero volts. Resting potential of the read 1 lines can be some small voltage. Resting potential of the read 2 line should be well toward the cutoff voltage of the transistors in order to prevent sneak paths; otherwise, the DC value is irrelevant.

When operating as an ordinary memory cell, the choice of real charge on the gate of transistor $T_2$ is cut off when all lines (except, of course, write) are at resting potential.

If read 2 is then changed to a voltage such as to capacitively couple onto the gate of transistor $T_2$ a voltage of magnitude and sign such that it drives transistor $T_2$ into conduction only if the value initially present on the gate of transistor $T_2$ was that closer to the conduction level then for such cells, the voltage on read 1 will be connected to the corresponding digit line. To illustrate, assume that for a P channel enhancement mode device, conduction occurs only if the voltage on the gate is more negative than $-3$ volts. Hence, the two values chosen as possibilities for the real charge would be such as to leave either $-2.0$ or $0.0$ volts on the gate of transistor $T_2$ under resting conditions. A negative voltage change applied to read 2 of sufficient magnitude to couple −2.0 volts (additional) onto the gate of transistor $T_2$ will cause transistor $T_2$ to conduct from drain to source only if −2.0 volts was originally present. For such a condition on transistor $T_2$, the small voltage on the read 1 line will be connected to the corresponding digit line and can be sensed there. The small voltage on read 1 would preferably be about −0.5 volt. This would give a good signal, but could not cause conduction in other cells along the same digit line. Although a small positive voltage could be used, it would run the risk of forward biasing the isolating junction of the digit line. The cells along a read 2 line would constitute a "word" in the 2D memory. The memory could be operated in a 2½ D mode by dividing each "word" (which might contain 3000 or more bits) into several shorter words for access via a smaller number of external lines than 3000.

In operation as an associative memory, storage of information is precisely as in the operation of an ordinary memory cell, except that the information is complemented and duplicated. Two cells in a word are used for each bit, one for the bit, and one for its complement. If a match is sought on this bit, one of the digit lines is brought to a voltage such that it couples −2.0 volts onto the gates of the $T_2$ transistors along that digit line. The digit line of the pair is chosen such that a match of the bit will not cause conduction of transistor $T_2$ (i.e. the stored value would be 0.0 volt). Any mismatch will cause conduction of a $T_2$ transistor, thus connecting a digital voltage of −2.0 or more volts onto the read 1 line of the word containing the mismatch. This can operate a detector which flags the unmatched word.

Operation as a crosspoint or switch is similar to that of the memory cell and associative memory cell modes except that the values for the real charge on the gates of $T_2$ transistors are chosen from two values, one of which permits continuous conduction through transistor $T_2$, the other completely preventing conduction through transistor $T_2$. Analog (or low voltage digital) signals can then be conducted via $T_2$ transistors among various digit lines and/or read 1 lines.

In operation as a sample and hold multiplexer, analog signals introduced on digit lines or read 1 lines are sampled onto other digit lines or read lines by pulsing read 2 lines while real charges of the type used for the ordinary memory cells are already introduced on appropriate $T_2$ transistors' gates. In all preceding modes, low or moderate impedance line terminations are most useful on all lines, so as to reduce the time that capacitive through-coupling persists. In this mode, high impedance terminations are used on those lines which are to be outputs, so that the line capacitance will act as a hold capacitor. The switch operation would be done by read 2 lines, since they are nowhere direct coupled to the digit or write 1 lines. The order of switching can be remembered by using the appropriate arrangement of cells containing a real charge of the half-select value (−2.0 volts in our example) and sequencing the read 2 lines. If this is done, conference connections of any number or size are possible.

Since large overlaps of conductors are designed onto these cells, construction tolerances are relatively loose compared to the usual enhancement mode field-effect transistor in which precise alignment of gate metal with the channel is necessary in order to optimize operation.

I claim:

1. An integrated circuit array comprising:
(a) a semiconductor of one substrate conductivity type having regions of the opposite conductivity type including:
  (1) a set of parallel first strips in columns buried beneath and parallel to the surface of the substrate material;
  (2) a set of first plugs spaced periodically along each of the first strips and joining the strips to the surface of the substrate and further aligned in rows along the surface, the rows being perpendicular to the first strips;
  (3) a set of parallel second strips lying in the surface and perpendicular to the set of parallel first strips and each adjacent to but not touching a row of first plugs forming a set of first channel gaps and further not touching any first strip or first plug; and
  (4) a set of second plugs lying in the surface and each adjacent to but not touching a second strip forming a second channel gap and paired to an adjacent first plug which forms a first channel gap with the same second strip and spaced from any first plug, first strip, and second strip;
(b) a first layer of insulator material covering the surface of the semiconductor materials;
(c) a set of first gates of conducting material lying upon the first layer of insulator material with each first gate lying above the second channel gap between a first plug and a second strip;
(d) a set of second gates upon the insulator layer with each second gate lying above a first channel gap and above a portion of the adjacent second strip and above the first plug adjacent to the same first channel gap;
(e) a set of first conductors connecting the first gates one to another forming columns parallel to the first strips; and
(f) a set of second conductors each connecting a second gate through the first layer of insulator material to the second plug, which is paired to the first plug lying beneath the second gate.

2. An integrated circuit array according to claim 1 which further comprises a third insulator layer deposited in surface contact upon the structure of said array.

3. An integrated circuit array according to claim 2 which further comprises a first conducting layer in surface contact with the structure of said array.

4. An integrated circuit array according to claim 3 wherein the first conducting layer is divided into:
(a) first bands parallel to and lying above the first strips and second gates; and
(b) second bands interposed between and insulated from the first bands.

5. An integrated circuit array according to claim 4 which further comprises an insulator layer and a shielding biasing layer deposited successively upon the structure of said array.

6. An integrated circuit array according to claim 1 which further comprises a set of digit metal strips which lie upon the second strips beneath the first layer of insulator material and each digit metal strip being within the boundaries of the second strip upon which that digit metal strip lies.

7. An integrated circuit array according to claim 6 which further comprises a third insulator layer deposited in surface contact upon the structure of said array.

8. An integrated circuit array according to claim 7 which further comprises a first conducting layer in surface contact with the structure of said array.

9. An integrated circuit array according to claim 8 wherein the first conducting layer is divided into:
(a) first bands parallel to and lying above the first strips and second gates; and
(b) second bands interposed between and insulated from the first bands.

10. An integrated circuit array according to claim 9 which further comprises an insulator layer and a shielding biasing layer deposited successively upon the structure of said array.

11. An integrated circuit array according to claim 1 which further comprises a second insulator layer which insulates each second conductor from the first conductor passing adjacent thereto.

12. An integrated circuit array according to claim 11 which further comprises a third insulator layer deposited in surface contact upon the structure of said array.

13. An integrated circuit array according to claim 12 which further comprises a first conducting layer in surface contact with the structure of said array.

14. An integrated circuit array according to claim 13 wherein the first conducting layer is divided into:

(a) first bands parallel to and lying above the first strips and second gates; and (b) second bands interposed between and insulated from the first bands.

15. An integrated circuit array according to claim 14 which further comprises an insulator layer and a shielding biasing layer deposited successively upon the structure of said array.

16. An integrated circuit array according to claim 11 which further comprises a set of digit metal strips which lie upon the second strips beneath the first layer of insulator material and each digital metal strip being within the boundaries of the second strip upon which that digit metal strip lies.

17. An integrated circuit array according to claim 16 which further comprises a third insulator layer deposited in surface contact upon the structure of said array.

18. An integrated circuit array according to claim 17 which further comprises a first conducting layer in surface contact with the structure of said array.

19. An integrated circuit array according to claim 18 wherein the first conducting layer is divided into:

(a) first bands parallel to and lying above the first strips and second gates; and (b) second bands interposed between and insulated from the first bands.

20. An integrated circuit array according to claim 19 which further comprises an insulator layer and a shielding biasing layer deposited successively upon the structure of said array.

21. An integrated circuit array according to claim 1 which further comprises a set of third strips lying parallel to the first strips and connecting all first strips into a continuous sheet P-type region not touching any second strip and further not touching any second plug.

22. Integrated circuit array according to claim 21 which further comprises a third insulator layer and a first conducting layer deposited successively in surface contact upon the structure of said array with the first conducting layer divided into:

(a) first bands parallel to and lying above the first strips and second gates; and (b) second bands interposed between and insulated from the first bands.

23. An integrated circuit array according to claim 22 which further comprises an insulator layer and a shielding biasing layer deposited successively upon the structure of said array.

24. An integrated circuit array according to claim 21 which further comprises a second insulator layer which insulates each second conductor from the first conductor passing adjacent thereto and a first conducting layer in surface contact with the structure of said array wherein the first conducting layer is divided into:

(a) first bands parallel to and lying above the first strips and second gates; and (b) second bands interposed between and insulated from the first bands.

25. An integrated circuit array according to claim 24 which further comprises an insulator layer and a shielding biasing layer deposited successively upon the structure of said array.

26. An integrated circuit array according to claim 24 which further comprises a set of digit metal strips which lie upon the second strips beneath the first layer of insulator material and each digital metal strip being within the boundaries of the second strip upon which that digit metal strip lies.

27. An integrated circuit array according to claim 26 which further comprises an insulator layer and a shielding biasing layer deposited successively upon the structure of said array.

28. An integrated circuit array according to claim 22 which further comprises a set of digit metal strips which lie upon the second strips beneath the first layer of insulator material and each digital metal strip being within the boundaries of the second strip upon which that digit metal strip lies.

29. An integrated circuit array according to claim 28 which further comprises an insulator layer and a shielding biasing layer deposited successively upon the structure of said array.

References Cited

UNITED STATES PATENTS 3,365,707 1/1968 Mayhew ------------ 317—235
3,388,292 6/1968 Burns -------------- 307—205

OTHER REFERENCES

IBM Tech. Discl. Bul., "Component Interconnections for Integrated Circuits," by Agusta et al., vol. 5, No. 12, May 1966, pp. 1843–44.

JERRY D. CRAIG, Primary Examiner

U.S. Cl. X.R.

307—251, 303, 304; 340—173